(12) United States Patent
Kim et al.

(10) Patent No.: US 9,189,726 B2
(45) Date of Patent: Nov. 17, 2015

(54) RFID TAG INCLUDING PROTECTION LAYERS AND HAVING ENHANCED DURABILITY

(75) Inventors: Yong-Jun Kim, Changwon (KR); Won-Jun Nam, Changwon (KR)

(73) Assignee: INTELLECTUAL DISCOVERY CO., LTD., Seoul (KR)

(*) Notice: Subject to any disclaimer, the term of this patent is extended or adjusted under 35 U.S.C. 154(b) by 58 days.

(21) Appl. No.: 13/455,352

(22) Filed: Apr. 25, 2012

(65) Prior Publication Data

US 2012/0273577 A1 Nov. 1, 2012

(30) Foreign Application Priority Data

Apr. 29, 2011 (KR) .................. 10-2011-0040970

(51) Int. Cl.
*G06K 19/077* (2006.01)
(52) U.S. Cl.
CPC .............................. *G06K 19/07722* (2013.01)
(58) Field of Classification Search
CPC .............................................. G06K 19/07722
USPC ................... 235/488, 492; 340/572.1, 572.7
See application file for complete search history.

(56) References Cited

U.S. PATENT DOCUMENTS

| | | | |
|---|---|---|---|
| 2007/0241909 A1 | 10/2007 | Kato | |
| 2008/0252462 A1* | 10/2008 | Sakama | 340/572.7 |
| 2008/0315311 A1* | 12/2008 | Okamoto | 257/347 |
| 2009/0076363 A1* | 3/2009 | Bly et al. | 600/372 |
| 2009/0079574 A1 | 3/2009 | Oroku et al. | |
| 2009/0109002 A1* | 4/2009 | Hadley et al. | 340/10.1 |
| 2010/0123011 A1 | 5/2010 | Baba et al. | |

FOREIGN PATENT DOCUMENTS

| | | | | |
|---|---|---|---|---|
| JP | 04207094 A | * | 7/1992 | H05K 1/03 |
| KR | 1020080065399 A | | 7/2008 | |
| KR | 1020080108786 A | | 12/2008 | |
| KR | 1020090030241 A | | 3/2009 | |
| KR | 1020090104483 A | | 10/2009 | |
| KR | 1020100055328 A | | 5/2010 | |

* cited by examiner

*Primary Examiner* — Thien T Mai
*Assistant Examiner* — Toan Ly
(74) *Attorney, Agent, or Firm* — Sughrue Mion, PLLC

(57) ABSTRACT

Provided is a radio frequency identification (RFID) tag including: a pattern layer which includes a first conductor having a pattern and an RFID chip electrically connected to the first conductor; an insulating layer which insulates the pattern layer from the radiation layer; a radiation layer which is attached to the insulating layer, and includes a second conductor having a radiation pattern inductively coupled to the first conductor; a lower protection layer disposed below a combination of the pattern layer, the insulating layer and the radiation layer; and an upper protection layer disposed above the combination of the pattern layer, the insulating layer and the radiation layer.

8 Claims, 4 Drawing Sheets

RFID TAG INCLUDING PROTECTION LAYERS AND HAVING ENHANCED DURABILITY

CROSS-REFERENCE TO RELATED PATENT APPLICATION

This application claims priority from Korean Patent Application No. 10-2011-0040970, filed on Apr. 29, 2011, in the Korean Intellectual Property Office, the disclosure of which is incorporated herein in its entirety by reference.

BACKGROUND

1. Field

Apparatuses consistent with exemplary embodiments relate to a radio frequency identification (RFID) tag, and more particularly, to an RFID tag attached to a member requiring to be washed.

2. Description of the Related Art

Initially, an RFID technology was regarded as being proper for product circulation or distribution, and thus, was used in fields related to product circulation or distribution. However, an RFID technology is being widely used in many different fields at present, and also is used in poor environments. In particular, an RFID technology is required in laundry, semiconductor, and mold fields, in which an RFID tag cannot be used as a barcode. An RFID tag is considered to have a great effect in the laundry business, and thus, may be seen as a necessity, but because of its reliability, performance, etc., there are doubts on whether it can be used in the laundry business. In order to resolve such problems of an RFID tag, extensive research has recently been conducted on a tag for laundry.

As a result of the research, firstly, an RFID tag that is waterproof when packaged has been developed. Early RFID tags were mostly formed of polycarbonate (PC) or polyamide (PA). Early RFID tags were waterproof and had a high heat-resistant property, and also satisfied a general washing condition, that is, 50 cycles at a temperature of 100° C. However, since early RFID tags were formed of an injection mold material, such RFID tags were prone to damage due to an external impact. In particular, early RFID tags that were thick, and had high strength may not withstand today's inline process including washing, spin-drying, drying, and ironing.

Secondly, a flexible RFID tag has been developed. A flexible RFID tag uses a flexible injection mold material, and uses an inlay coated with polyethylene terephthalate (PET). In this case, such an RFID tag is flexible, and may be bent during washing, and thus, may not be broken. However, a flexible injection mold material is easily affected by heat, and is easy to break. Furthermore, a flexible injection mold material may not protect an RFID chip. Accordingly, a flexible injection mold material is easily broken, and thus, may not be used for manufacturers handling a large load of laundry.

Thirdly, in order to protect an RFID chip, a portion of the RFID chip where the RFID chip attaches itself may be coated with a hard material or an elastic material. In this case, such an RFID chip may be protected, but reliability of the RFID tag may not be secured. In particular, a crack inevitably occurs due to a surface of an RFID chip being hard.

In an RFID tag for laundry, the most important issue is reliability. Users of an RFID tag for laundry do not include housewives and general users. Most users of an RFID tag for laundry are laundrymen handling a large load of laundry. Since a laundry process is automated, laundrymen focus on points that may not be easily controlled by humans. Because conditions such as being able to withstand entanglement of laundry, being waterproof, being able to withstand high temperature drying, being able to withstand ironing, and the like should be satisfied in a laundry process, there is a limitation in using unreliable products.

SUMMARY

One or more exemplary embodiments provide an RFID tag that does not easily break during washing and may safely protect an RFID chip embedded therein.

According to an aspect of an exemplary embodiment, there is provided an RFID tag including: a pattern layer which includes a first conductor having a pattern and an RFID chip electrically connected to the first conductor; an insulating layer which insulates the pattern layer from the radiation layer; a radiation layer which is attached to the insulating layer, and includes a second conductor having a radiation pattern inductively coupled to the first conductor; a lower protection layer disposed below a combination of the pattern layer, the insulating layer and the radiation layer; and an upper protection layer disposed above the combination of the pattern layer, the insulating layer and the radiation layer.

The pattern layer may include a printed circuit board on which the first conductor is formed.

The lower protection layer and the upper protection layer may be formed of a flexible material.

The radiation layer may include a printed circuit board on which the second conductor is formed.

The first conductor and the second conductor may be in a relationship of impedance matching.

The lower protection layer may include: a first polyimide layer and a first silicon layer. The first silicon layer may be attached to an upper surface of the first polyimide layer. The upper protection layer may include a second silicon layer and a second polyimide layer. The second silicon layer may be attached to an upper surface of the combination of the pattern layer, the insulating layer and the radiation layer. The second polyimide layer may be attached to an upper surface of the second silicon layer.

The RFID tag may further include a third silicon layer attached to a lower surface of the first polyimide layer and a fourth silicon layer attached to an upper surface of the second silicon layer.

Both the insulating plate formed in the radiation layer and the insulating plate formed in the pattern layer may be a printed circuit board.

According to an aspect of another exemplary embodiment, there is provided an RFID tag including a pattern layer, a radiation layer and a protection layer. The pattern layer may include a first conductor having a pattern; an RFID chip electrically connected to the first conductor; and a first substrate on which the first conductor and the RFID chip are formed. The radiation layer may be attached to the first substrate and comprise: a second conductor having a radiation pattern inductively coupled to the first conductor; and a second substrate on which the second conductor is formed. The protection layer may be disposed above the pattern layer. The first substrate may insulate the pattern layer from the radiation layer.

BRIEF DESCRIPTION OF THE DRAWINGS

The above and other aspects will become more apparent by describing in detail exemplary embodiments thereof with reference to the attached drawings, in which.

DETAILED DESCRIPTION OF THE EXEMPLARY EMBODIMENTS

Figure 1A:
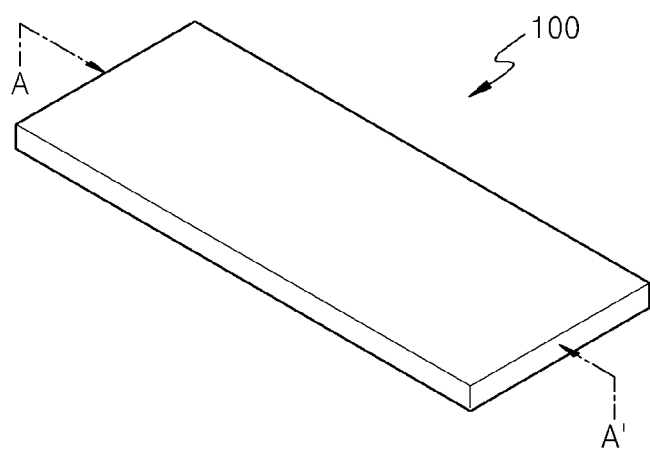
FIGS. 1A and 1B illustrate a perspective view of an RFID tag for laundry and an exploded perspective view of the RFID tag for laundry, respectively, according to an exemplary embodiment.

Hereinafter, exemplary embodiments will be described with reference to the attached drawings. Like reference numerals indicate corresponding parts in the drawings.

Figure 1B:
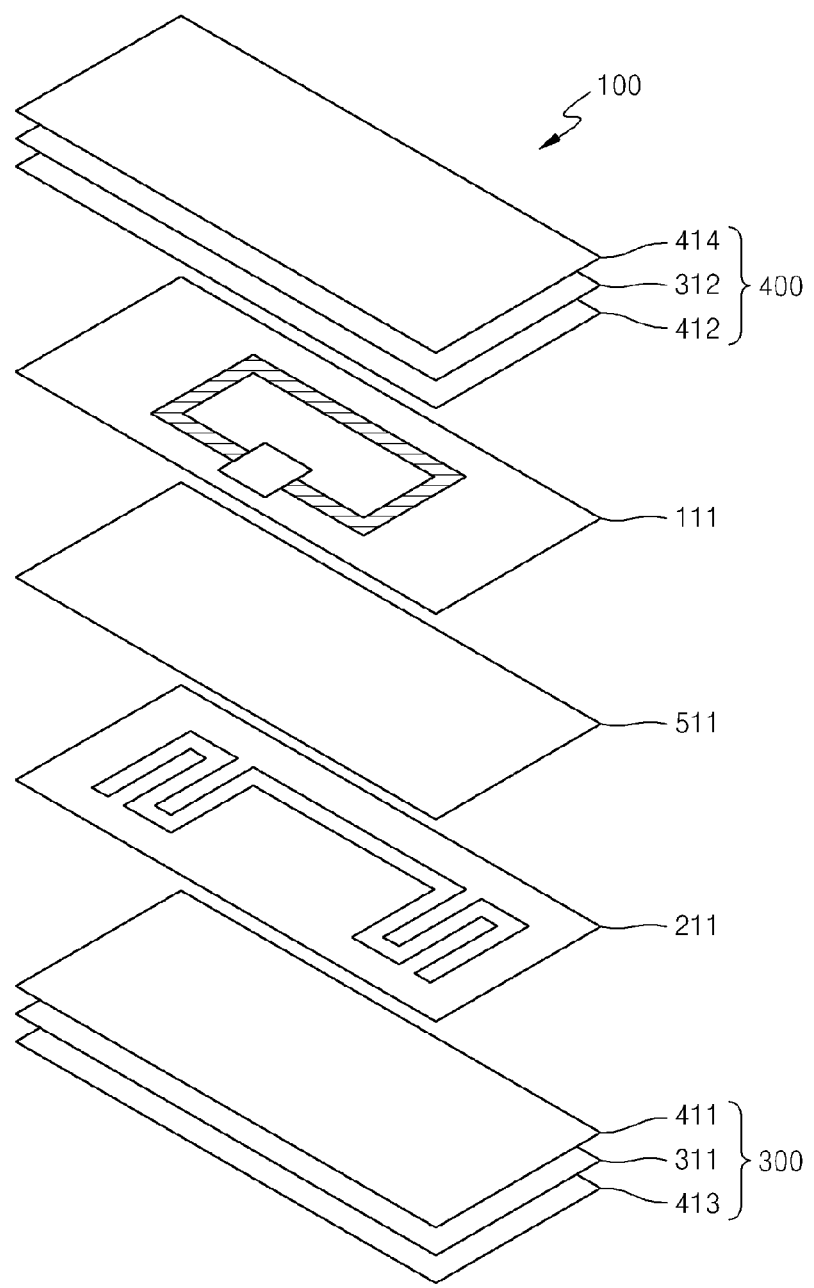
Figure 2:
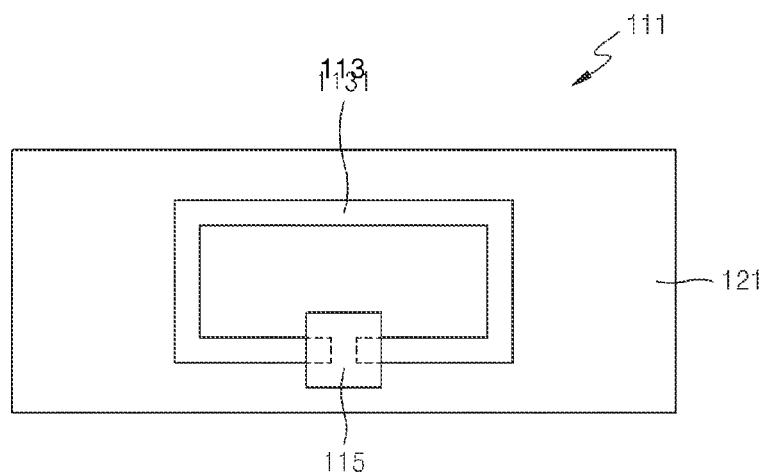
FIG. 2 is a plane view of a pattern layer shown in FIG. 1B, according to an exemplary embodiment.
Figure 3:
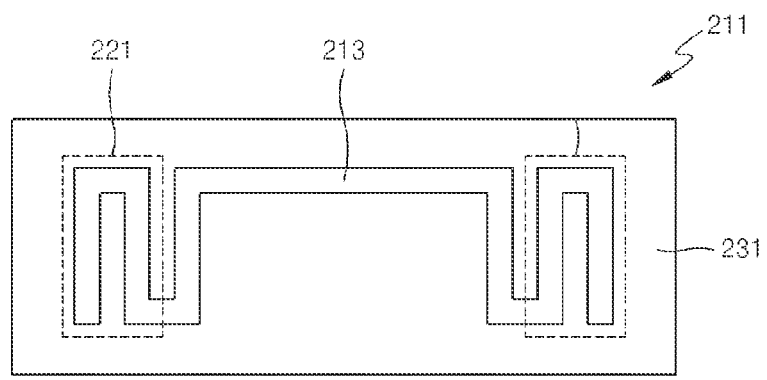
FIG. 3 is a plane view of a radiation layer shown in FIG. 1B, according to an exemplary embodiment.
Figure 4:
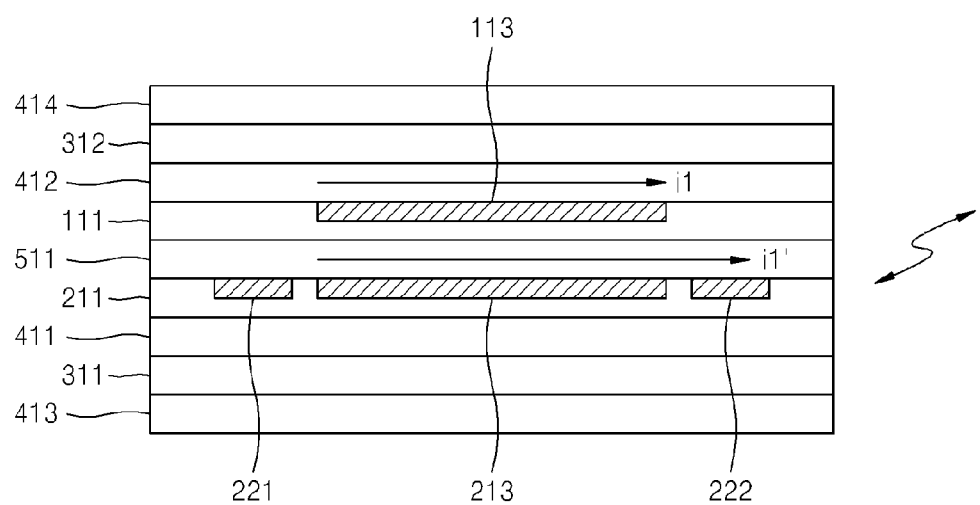
FIG. 4 is a cross-sectional view taken along a line A-A' of FIG. 1A, according to an exemplary embodiment.

FIGS. 1A and 1B illustrate a perspective view of an RFID tag 100 for laundry and an exploded perspective view of the RFID tag 100 for laundry, respectively, according to an exemplary embodiment. FIG. 2 is a plane view of a pattern layer 111 shown in FIG. 1B. FIG. 3 is a plane view of a radiation layer 211 shown in FIG. 1B, according to an exemplary embodiment. FIG. 4 is a cross-sectional view taken along a line A-A' of FIG. 1A, according to an exemplary embodiment. The RFID tag 100 for laundry according to the exemplary embodiments will be described with reference to FIGS. 1A through 4.

The RFID tag 100 includes a lower protection layer 300, a radiation layer 211, an insulating layer 511, a pattern layer 111, and an upper protection layer 400 that are sequentially stacked.

The lower protection layer 300 prevents the radiation layer 211 from being damaged by external elements. The lower protection layer 300 has relatively excellent adhesion, and thus, may be firmly adhered to the radiation layer 211. The lower protection layer 300 has flexibility and elasticity. Thus, when an external physical force is applied to the lower protection layer 300, the lower protection layer 300 may be bent or pressed, thereby preventing the lower protection layer 300 from being broken or torn. The lower protection layer 300 may include a first silicon layer 411, a first polyimide layer 311, and a third silicon layer 413. However, the lower protection layer 300 may be formed of only one or two of the three layers 411, 311 and 413, according to an exemplary embodiment.

The first silicon layer 411 is interposed between the first polyimide layer 311 and the radiation layer 211 to attach them to each other, and the third silicon layer 413 is attached to a lower surface of the first polyimide layer 311. The first and third silicon layers 411 and 413 have excellent adhesion, and thus, may be returned to their original states without being broken or being torn due to whirlpools during washing or when colliding with laundry. Also, the first and third silicon layers 411 and 413 are attached to the first polyimide layer 311, thereby preventing the RFID tag 100 from being melted due to a high temperature during laundry.

Silicone for forming the first and third silicon layers 411 and 413 is a polymer in which organosilicone, oxygen, etc. containing an organic-group are chemically connected to one another, and has characteristics such as a heat-resistant property, an oxidization-resistant property, a chemical-resistant property, a water repellent property or a water-resistant property, an electric insulating property, and the like.

The first polyimide layer 311 has relatively excellent adhesion, and thus, may be firmly attached to the first and third silicon layers 411 and 413. Also, the first polyimide layer 311 is flexible, and maintains its flexibility even when the first polyimide layer 311 is attached to the first and third silicon layers 411 and 413. Accordingly, adhesion between the first polyimide layer 311 and the first and third silicon layers 411 and 413 when they are attached to each other is relatively great. Accordingly, the first polyimide layer 311 may be returned to its original state without being broken or being torn due to impacts during washing or when colliding with laundry. The first polyimide layer 311 has high durability. As such, the first polyimide layer 311 may be firmly attached to the first and third silicon layers 411 and 413, and thus, the lower protection layer 300 may safely protect the radiation layer 211 from external elements.

Polyimide for forming the first polyimide layer 311 is a high heat-resistant engineering plastic including aromatic diamine and aromatic tetracarbon acid dianhydride. Polyimide has high rigidity and dimensional stability, and aromatic diamine and aromatic carboxylic acid are mixed with polyimide to produce various kinds of polyimide resins. Such polyimide resins are widely used for resin molding products, films, coating materials, fibers, and the like as electrical/electronic components, mechanical components, automobile components, and the like. Main characteristics of polyimide are as follows. Polyimide has a high heat resistance, may be used at an extremely low temperature, has an excellent insulating property (a wholly aromatic polyimide has a dielectric strength voltage of 22 kv/mm), is not softened at a high temperature, and may withstand high weight loads. Polyimide also has excellent radiation resistance and excellent salt tolerance.

The radiation layer 211 has a structure in which conductors 213, 221, and 222 having radiation patterns are formed on an insulating plate 231. The radiation layer 211 radiates a high frequency signal i1' induced by the pattern layer 111 to the outside, and/or indirectly transmits the high frequency signal i1' input from the outside to the pattern layer 111. In general, the RFID tag 100 may transmit and receive the high frequency signal i1' to and from an RFID reader (not shown). In this case, the high frequency signal i1' radiated from the radiation layer 211 is transmitted to the RFID reader, and the high frequency signal i1' received from the RFID reader is transmitted to an RFID chip 115 (shown in FIG. 2) via the radiation layer 211.

The insulating plate 231 constituting the radiation layer 211 may be configured as a printed circuit board (PCB). The PCB may be classified as a hard circuit board or a flexible circuit board, and thus, the insulating plate 231 may be configured as a hard circuit board or a flexible circuit board. The conductors 213, 221, and 222 having radiation patterns and serving as antennas are formed on the insulating plate 231. The conductors 213, 221, and 222 having radiation patterns may be formed by using any of various methods that allow the conductors 213, 221, and 222 to serve as antennas. For example, the conductors 213, 221, and 222 having radiation patterns may each be formed to have any of a straight line shape, an L-shape, a Π-shape, and the like, or a combination thereof. The radiation patterns may have a shape corresponding to a shape of a circuit formed in the pattern layer 111. The circuit formed in the pattern layer 111 may be a power feeding unit 113 as shown in FIG. 2.

The insulating layer 511 is interposed between the radiation layer 211 and the pattern layer 111 to firmly attach the radiation layer 211 and the pattern layer 111 to each other, and electrically insulate the power feeding unit 113 formed in the pattern layer 111 from the conductors 213, 221, and 222 formed in the radiation layer 211. Accordingly, the radiation layer 211 and the pattern layer 111 indirectly transmit and receive an electrical signal to and from the insulating layer 511. The insulating layer 511 may be formed of silicon. Alternatively, the insulating layer 511 may be formed of urethane having excellent adhesion and flexibility. The insulating layer 511 prevents the radiation layer 211 and the pattern layer 111 from being damaged or torn due to friction between the radiation layer 211 and the pattern layer 111.

The pattern layer 111 includes the power feeding unit 113, which is formed on an insulating plate 121, and the RFID chip 115 electrically contacting the power feeding unit 113. According to an exemplary embodiment, the insulating layer 511 described above may be omitted in forming the RFID tag 100 if the insulating plate 121 has characteristics of the insulating layer 511. The power feeding unit 113 is formed of a conductor having a power feeding pattern, and the RFID chip 115 is mounted on the conductor having a power feeding pattern. The RFID chip 115 and the power feeding unit 113 are electrically connected to each other. In this regard, the power feeding unit 113 may be formed to have a shape in which a high frequency signal i1 output from the RFID chip 115 and flowing to the power feeding unit 113 may be induced, with a maximum efficiency, in the conductors 213, 221, and 222 included in the radiation layer 211 and having radiation patterns, for example, a loop shape. Impedance of the power feeding unit 113 may be configured to match with impedance of the conductors 213, 221, and 222 included in the radiation layer 211. As such, by matching the impedance of the conductor 113 included in the pattern layer 111 and the impedance of the conductors 213, 221, and 222 included in the radiation layer 211, the high frequency signal i1 flowing to the power feeding unit 113 of the pattern layer 111 may be induced in the conductors 213, 221, and 222 of the radiation layer 211 with a maximum efficiency, and the high frequency signal i1' flowing to the conductors 213, 221, and 222 of the radiation layer 211 may be induced in the power feeding unit 113 of the pattern layer 111 with a maximum efficiency.

The RFID chip 115 installed in the pattern layer 111 is a semiconductor device, and stores various information. The information stored in the RFID chip 115 may be information about, for example, a manufacturing plant, a manufacturing time, a manufacturing method, a type, a history of a specific product, etc. If the RFID chip 115 receives a request signal of the RFID reader, the RFID chip 115 transmits information requested according to the request signal to the RFID reader via the pattern layer 111 and the radiation layer 211 wirelessly.

The power feeding unit 113 of the pattern layer 111 is indirectly coupled to the conductors 213, 221, and 222 of the radiation layer 211. That is, the power feeding unit 113 of the pattern layer 111 and the conductors 213, 221, and 222 of the radiation layer 211 are inductively coupled to each other. Accordingly, the high frequency signal i1 output from the RFID chip 115 and flowing to the power feeding unit 113 of the pattern layer 111 is induced in the conductors 213, 221, and 222 of the radiation layer 211 to be radiated to the outside, and the high frequency signal i1' received by the conductors 213, 221, and 222 of the radiation layer 211 from the outside is induced in the power feeding unit 113 of the pattern layer 111 to be transmitted to the RFID chip 115.

The power feeding unit 113 of the pattern layer 111 and the conductors 213, 221, and 222 of the radiation layer 211 are formed of a metal that is manufactured at low costs and has high conductivity, for example, copper (Co).

The insulating plate 121 of the pattern layer 111 may be formed of a PCB. The PCB is classified as a hard circuit board or a flexible circuit board. Although a type of the PCB may be selectively used according to a characteristic of the RFID tag 100, the PCB is required not to damage the RFID chip 115.

The insulating plate 121 of the pattern layer 111 and the insulating plate 231 of the radiation layer 211 may be formed of not only a PCB and but also any of various objects in which a patterned conductor may be formed.

The upper protection layer 400 prevents the pattern layer 111 from being damaged by external elements. The upper protection layer 400 has excellent adhesion, and thus, is firmly adhered to the pattern layer 111. The upper protection layer 400 has flexibility and elasticity. Thus, when an external physical force is applied to the upper protection layer 400, the upper protection layer 400 may be bent or pressed, thereby preventing the upper protection layer 400 from being broken or torn. The upper protection layer 400 may include a second silicon layer 412, a second polyimide layer 312, and a fourth silicon layer 414. Like the lower protection layer 300, the upper protection layer 400 may be formed of only one or two of the three layers 412, 312 and 414, according to an exemplary embodiment.

Performances and materials of the second and fourth silicon layers 412 and 414 and the second polyimide layer 312 are the same as those of the first and third silicon layers 411 and 413 and the first polyimide layer 311 constituting the lower protection layer 300, and thus, a repeated description thereof will be omitted here.

According to an exemplary embodiment, the RFID tag 100 may not include the lower protection layer 300, and instead, the insulating plate 231 of the radiation layer may be formed of at least one of the materials forming the first and third silicon layers 411 and 413 and the first polyimide layer 311 as described earlier.

According to an exemplary embodiment, positions of the pattern layer 111 and the radiation layer 211 may be changed with respect to the insulating layer 511.

The RFID tag for laundry according to the exemplary embodiments includes a radiation layer and a pattern layer. In an insulated state between the radiation layer and the pattern layer, the radiation layer and the pattern layer exchange a high frequency signal with each other through inductive coupling. Accordingly, even if an external impact is applied to the RFID tag during laundry, an electrical short circuit does not occur between the radiation layer and the pattern layer. Thus, the RFID tag may be safely protected so as to communicate with an RFID reader even after the washing.

Also, the radiation layer and the pattern layer included in the RFID tag for laundry are surrounded by polyimide layers and silicon layers to be protected. The polyimide layers and the silicon layers have excellent adhesion, and thus, may safely protect the radiation layer and the pattern layer. Also, the polyimide layers and the silicon layers have flexibility, and thus, even if an external impact that may occur during laundry is applied to the RFID tag, the RFID tag is not torn or broken.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims.

What is claimed is:
1. A radio frequency identification (RFID) tag comprising:
   a pattern layer which comprises a first conductor, having a pattern, and an RFID chip electrically connected to the first conductor,
   an insulating layer which insulates the pattern layer from a radiation layer;

the radiation layer which is attached to the insulating layer, and comprises a second conductor having a radiation pattern inductively coupled to the first conductor of which impedance is configured to match with impedance of the second conductor;

a lower protection layer which is disposed below and attached to a combination of the pattern layer, the insulating layer and the radiation layer, and comprises at least one first polyimide layer comprising polyimide and directly attached to a first silicon layer comprising silicon and attached to the combination of the pattern layer, the insulating layer and the radiation layer;

an upper protection layer which is disposed above the combination of the pattern layer, the insulating layer and the radiation layer, and comprises at least one second polyimide layer comprising polyimide and a second silicon layer comprising silicon;

a third silicon layer with water resistant property, which is attached to a lower surface of the first polyimide layer; and a fourth silicon layer with water resistant property, which is attached to an upper surface of the second polyimide layer, wherein the radio frequency identification (RFID) tag is attached to a member to be washed.

2. The RFID tag of claim 1, wherein the pattern layer comprises a printed circuit board on which the first conductor is formed.

3. The RFID tag of claim 1, wherein the lower protection layer and the upper protection layer are formed of a flexible material.

4. The RFID tag of claim 1, wherein the radiation layer comprises a printed circuit board on which the second conductor is formed.

5. The RFID tag of claim 1, wherein the insulating layer is formed of silicon.

6. The RFID tag of claim 1, wherein the first conductor induces a first signal generated in the pattern layer to the second conductor, and the second conductor induces a second signal, received from an outside, to the first conductor.

7. The RFID tag of claim 6, wherein the first conductor is a circuit which receives the first signal generated from the RFID in response to the second signal induced from the second conductor, and wherein the first signal comprises information related to a product to which the RFID tag is attached.

8. The RFID of claim 1, wherein at least one of the first and second polyimide layers comprises plastic including aromatic diamine and aromatic tetracarbon acid dianhydride.

* * * * *